United States Patent
Lee et al.

(10) Patent No.: US 9,147,889 B2
(45) Date of Patent: Sep. 29, 2015

(54) COMPOSITE SEPARATOR FOR POLYMER ELECTROLYTE MEMBRANE FUEL CELL AND METHOD FOR MANUFACTURING THE SAME

(71) Applicants: Hyundai Motor Company, Seoul (KR); Korea Advanced Institute of Science and Technology, Daejeon (KR)

(72) Inventors: Dai Gil Lee, Daejeon (KR); Ha Na Yu, Gyeongsangbuk-do (KR); Byoung Chul Kim, Daejeon (KR); Bu Gi Kim, Gwangju (KR); Jun Woo Lim, Daejeon (KR); Jung Do Suh, Seoul (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/268,303

(22) Filed: May 2, 2014

(65) Prior Publication Data
US 2014/0242497 A1    Aug. 28, 2014

Related U.S. Application Data

(62) Division of application No. 12/950,838, filed on Nov. 19, 2010, now Pat. No. 8,748,055.

(30) Foreign Application Priority Data

Sep. 29, 2010    (KR) .................. 10-2010-0094251

(51) Int. Cl.
*H01M 8/02*    (2006.01)
*H01M 2/14*    (2006.01)
*H01M 8/10*    (2006.01)

(52) U.S. Cl.
CPC .......... *H01M 8/0234* (2013.01); *H01M 8/0245* (2013.01); *H01M 2/14* (2013.01); *H01M 2/145* (2013.01); *H01M 2008/1095* (2013.01); *Y02E 60/50* (2013.01); *Y02T 10/54* (2013.01)

(58) Field of Classification Search
CPC ..... H01M 2/14; H01M 2/145; H01M 8/0234; H01M 8/0245; H01M 2008/1095; H01M 8/0256; H01M 8/04; H01M 8/00; Y02E 60/50; Y02T 10/54
USPC .......... 429/457, 514, 518, 129, 246, 247, 535
See application file for complete search history.

(56) References Cited

U.S. PATENT DOCUMENTS

| | | | |
|---|---|---|---|
| 6,864,007 B1 * | 3/2005 | Iqbal et al. | 429/518 |
| 2004/0062974 A1 * | 4/2004 | Abd Elhamid et al. | 429/34 |

(Continued)

FOREIGN PATENT DOCUMENTS

| | | |
|---|---|---|
| CN | 101604736 A | 12/2009 |
| JP | 2007280725 A | 10/2007 |

(Continued)

*Primary Examiner* — Milton I Cano
*Assistant Examiner* — Ling R Zeng
(74) *Attorney, Agent, or Firm* — Mintz Levin Cohn Ferris Glovsky and Popeo, P.C.; Peter F. Corless

(57) ABSTRACT

The present invention provides a composite separator for a polymer electrolyte membrane fuel cell (PEMFC) and a method for manufacturing the same. The inventive method involves allowing graphite foil layers to be brought into direct contact with each other when graphite foils are stacked on both sides of a carbon fiber reinforced composite material prepreg, thereby improving electrical conductivity in the thickness direction of the separator.

2 Claims, 4 Drawing Sheets

(56) References Cited

U.S. PATENT DOCUMENTS

2008/0220282 A1  9/2008  Jang et al.
2008/0299419 A1  12/2008  Zhamu et al.

FOREIGN PATENT DOCUMENTS

| JP | 2009093937 A | 4/2009 |
| JP | 2009093965 A | 4/2009 |

* cited by examiner

COMPOSITE SEPARATOR FOR POLYMER ELECTROLYTE MEMBRANE FUEL CELL AND METHOD FOR MANUFACTURING THE SAME

CROSS-REFERENCE TO RELATED APPLICATION

This application claims under 35 U.S.C. §119(a) the benefit of Korean Patent Application No. 10-2010-0094251 filed Sep. 29, 2010, the entire contents of which are incorporated herein by reference.

BACKGROUND (a) Technical Field

The present invention relates to a composite separator for a polymer electrolyte membrane fuel cell (PEMFC). More particularly, the invention relates to a composite separator for a PEMFC and a method for manufacturing same. The inventive method involves bringing graphite foil layers into direct contact with each other when graphite foils are stacked on both sides of a carbon fiber reinforced composite material prepreg, thereby improving electrical conductivity in the thickness direction of the separator.

(b) Background Art

In general, a polymer electrolyte membrane fuel cell (PEMFC) is a device that generates electricity with heat and water by an electrochemical reaction between hydrogen and oxygen (or air) as reactant gases. The PEMFC has various advantages, such as, high energy efficiency, high current density, high power density, short start-up time, and rapid response to a load change as compared to the other types of fuel cells. For these reasons, it can be used in various applications, such as, a power source for zero-emission vehicles, an independent power plant, a portable power source, and a military power source, among other applications.

A conventional fuel cell stack is shown in FIG. 1 and described, as follows.

A conventional fuel cell stack includes a membrane-electrode assembly (MEA), which is positioned in the center of each unit cell of the fuel cell stack. The MEA comprises a solid polymer electrolyte membrane 60, through which hydrogen ions (protons) are transported, and an electrode/catalyst layer disposed on each of both sides of the polymer electrolyte membrane 60. The electrode/catalyst layer can include an air electrode (cathode) 61 and a fuel electrode (anode) 62, in which an electrochemical reaction between hydrogen and oxygen takes place.

Moreover, a gas diffusion layer (GDL) 40 and a gasket 41 are sequentially stacked on both sides of the MEA, where the cathode 61 and the anode 62 are located. A separator 30, including flow fields for supplying fuel and discharging water produced by the reaction, is located on the outside of the GDL 40. An end plate 50 for supporting the above-described components is connected to each of both ends thereof.

Therefore, at the anode 62 of the fuel cell stack, hydrogen is dissociated into hydrogen ions (protons, $H^+$) and electrons ($e^-$) by an oxidation reaction of hydrogen. The hydrogen ions and electrons are transmitted to the cathode 61 through the electrolyte membrane 60 and the separator 30, respectively. At the cathode 61, water is produced by the electrochemical reaction in which the hydrogen ions and electrons transmitted from the anode 62. The oxygen in the air participates and, at the same time, electrical energy is produced by the flow of electrons.

In the above-described fuel cell stack, the separator divides the unit cells of the fuel cell and, at the same time, serves as a current path between the unit cells. The flow fields formed in the separator serve as paths for supplying hydrogen and oxygen and discharging water produced by the reaction.

Since the water produced by the reaction inhibits the chemical reaction occurring in the electrolyte membrane of the fuel cell, the water should be rapidly discharged to the outside. Therefore, the separator material may have high surface energy such that the water is rapidly spread on the surface of the separator (hydrophilicity) or may have low surface energy such that the water rolls down the surface of the separator (hydrophobicity). Therefore, it is necessary to maximize the hydrophilicity or hydrophobicity of the flow fields in order to minimize the electrical contact resistance between the separators and facilitate the circulation of the produced water.

In consideration of these factors, conventional separators are formed of graphite, thin stainless steel, or a composite material in which expanded carbon particles or graphite particles are mixed with a polymer matrix.

By comparison, the electrical resistance of stainless steel is significantly lower than the electrical resistance of graphite.

However, since the electrical contact resistance is related to the contact area, pressure, and rigidity, the electrical contact resistance of graphite is lower than that of stainless steel. However, while the graphite satisfies the conditions of the separator in electrical and chemical aspects, it is vulnerable to impact and is difficult to process.

Therefore, a continuous carbon fiber composite separator which can improve the electrical, chemical, and mechanical properties would be an advance in the art. Moreover, a method for manufacturing a separator for a fuel cell which can reduce the contact resistance between unit cells, which is one of the most important electrical properties, and control the surface energy of a continuous carbon fiber composite separator to facilitate the discharge of water produced by the reaction has been required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art. Accordingly, the present invention provides a composite separator for a polymer electrolyte membrane fuel cell (PEMFC) and a method for manufacturing same. According to the invention, graphite foil layers are allowed to be brought into direct contact with each other through a plurality of holes formed in a composite material layer interposed between graphite foils prepared by compressing expanded graphite, when the graphite foils are stacked on both sides of a carbon fiber reinforced composite material prepreg. This arrangement reduces the electrical contact resistance of the carbon fiber reinforced composite material, increases the hydrophilicity by the graphite foils, and improves the electrical conductivity in the thickness direction of the separator.

In one aspect, the present invention provides a composite separator for a polymer electrolyte membrane fuel cell, the separator including: a carbon fiber reinforced composite material including a plurality of holes; graphite foils having the same size as the carbon fiber reinforced composite material and stacked on both sides of the carbon fiber reinforced composite material; and a connecting portion formed in each hole of the carbon fiber reinforced composite material as a portion of the graphite foils becomes filled into the holes, thereby conductively connecting the graphite foils stacked on both sides of the carbon fiber reinforced composite material to each other.

In a preferred embodiment, the connecting portion may be filled in each hole of the carbon fiber reinforced composite material by deformation in the thickness direction of the graphite foils when the carbon fiber reinforced composite material and the graphite foils are pressed at high temperature and high pressure.

In another preferred embodiment, the plurality of holes may be formed on the edges of the carbon fiber reinforced composite material, which corresponds to an outer surface of the graphite foils to which a gasket is to be bonded.

In another aspect, the present invention provides a method for manufacturing a composite separator for a polymer electrolyte membrane fuel cell, the method including: providing a carbon fiber reinforced composite material in the form of a prepreg including a plurality of holes and graphite foils having the same size as the carbon fiber reinforced composite material; stacking the graphite foils on both sides of the carbon fiber reinforced composite material and forming air/hydrogen/coolant supply manifolds on both ends thereof; forming channels on an outer surface of each graphite foil by applying a high temperature and high pressure using a hot press or mold for channel formation; and allowing a connecting portion to be formed in each hole of the carbon fiber reinforced composite material as a portion of the graphite foils is filled in the holes by the high temperature and high pressure applied during the formation of the channels such that the graphite foils stacked on both sides of the carbon fiber reinforced composite material are conductively connected to each other.

In a preferred embodiment, the carbon fiber reinforced composite material and the graphite foils may be mechanically bonded to each other as a small amount of excessive resin of the carbon fiber reinforced composite material is impregnated into the graphite foils.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
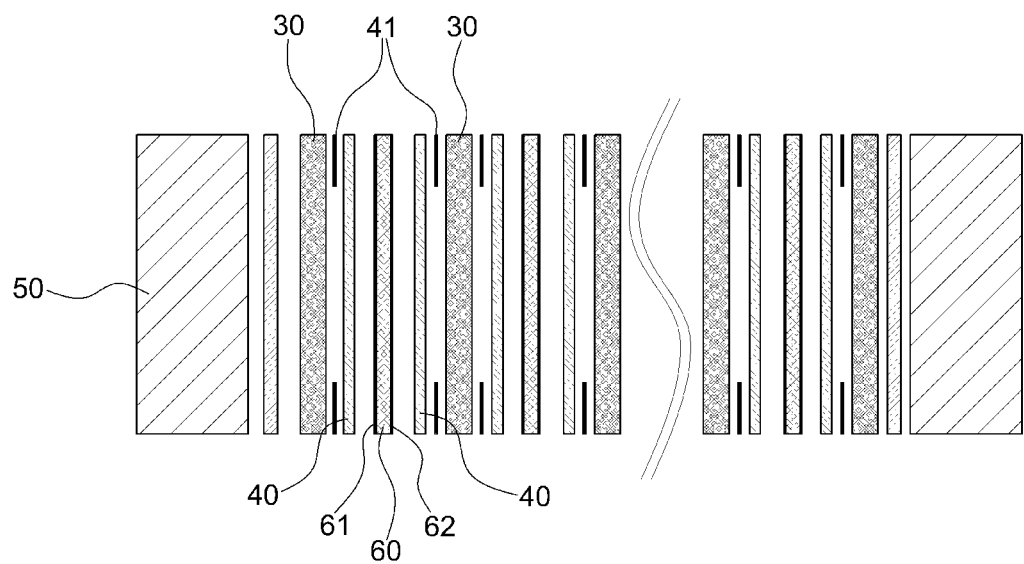
FIG. 1 is a schematic diagram showing the configuration of a conventional fuel cell stack.

Reference numerals set forth in the Drawings includes reference to the following elements as further discussed below:

| | |
|---|---|
| 10: carbon fiber reinforced composite material | |
| 11: graphite foil | 12: hot press for channel formation |
| 13: manifold | 14: channel |
| 15: connecting portion | 16: hole |
| 17: gasket | 30: separator |
| 40: gas diffusion layer | 41: gasket |
| 50: end plate | 60: polymer electrolyte membrane |
| 61: cathode | 62: anode |

It should be understood that the appended drawings are not necessarily to scale and presenti a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. To the contrary, the invention is intended to cover not only the exemplary embodiments, but also various alternatives, modifications, equivalents and other embodiments, which may be included within the spirit and scope of the invention as defined by the appended claims.

For a better understanding of the present invention, the properties of a continuous carbon fiber reinforced composite material and graphite, which are used to manufacture a fuel cell separator of the present invention, and other materials, such as, carbon powder composite material and stainless steel (SUS), are compared as shown in the following Table 1:

TABLE 1

| Properties | Graphite | Carbon powder composite | Metal (SUS) | Carbon fiber reinforced composite | DOE reference |
|---|---|---|---|---|---|
| Specific gravity (g/cm$^3$) | 1.88 | 1.92 | 7.87 | 1.9 | N/A |
| Thermal conductivity (Raw material, W/mK) | 100 | 0.8 to 20 | 16.3 | 48.4 to 60.6 | 40 |
| Contact resistance (@150 psig, mΩcm$^2$) | 15.6 | 20.2 | 75 | 20 to 30 | 25 |
| Thermal expansion coefficient (10$^{-6}$/K) | 4.7 | 10 to 30 | 11 to 18 | −0.12 to 22 | N/A |
| Electrical conductivity (S/cm) | 770 | 251 | 14,000 | 100 to 125 | above 100 |
| Flexural strength (MPa) | 85 | 50 | 510 | 1,550 | above 34 |
| Compressive strength (MPa) | 170 | Satisfied | Satisfied | Satisfied | above 105 |
| Corrosion resistance | Satisfied | Satisfied | Expensive coating required | Satisfied | above 1 mA/cm$^2$ |

As shown in Table 1, the continuous carbon fiber reinforced composite material used in the present invention has the following advantages: (1) it can contribute to a reduction in weight as its specific gravity is about a quarter of that of the metal material (SUS); (2) the thickness of the plate itself can be reduced, which increases the reaction area per unit volume, thereby increasing the power density; (3) the compressive strength and corrosion resistance satisfy the requirements; (4) the graphite formed on the outermost surface of the separator has a high thermal conductivity and a very low contact resistance; and (5) it has a high surface energy (hydrophilicity) to rapidly discharge water produced by the reaction to the outside, which reduces the current loss, thereby significantly improving the efficiency of the fuel cell.

Based on these findings, the present invention is aimed at providing a composite separator having excellent electrical conductivity which is manufactured by allowing graphite foil layers to be brought into direct contact with each other through a plurality of holes formed in a composite material layer that is interposed between the graphite foil layers. The graphite foil layers are brought into direct contact with each other when expanded graphite foil layers placed on either side of the composite layer are compressed, causing a portion of graphite foil overlaying the plurality of holes on the composite to be locally deformed into the holes and forming a connection portion of graphite foil therein. These graphite connections form an electrical conductive path from one foil to the next through the composite material.

Thus, in one embodiment, the present invention provides a composite separator for a polymer electrolyte membrane fuel cell, in which the interfacial resistance between a composite material layer and graphite layers is reduced. The graphite foil layers are allowed to be partially brought into direct contact with each other when expanded graphite is compressed on either side of the composite material causing a portion of the graphite material to be locally deformed or expanded into holes in the composite material. The graphite foil layers thus form connection points through the holes in the composite material, thereby reducing the electrical contact resistance of the carbon fiber reinforced composite material and increasing the hydrophilicity of the surface of the separator, which facilitates the circulation of water produced by the reaction, thereby reducing the energy loss.

Figure 2:
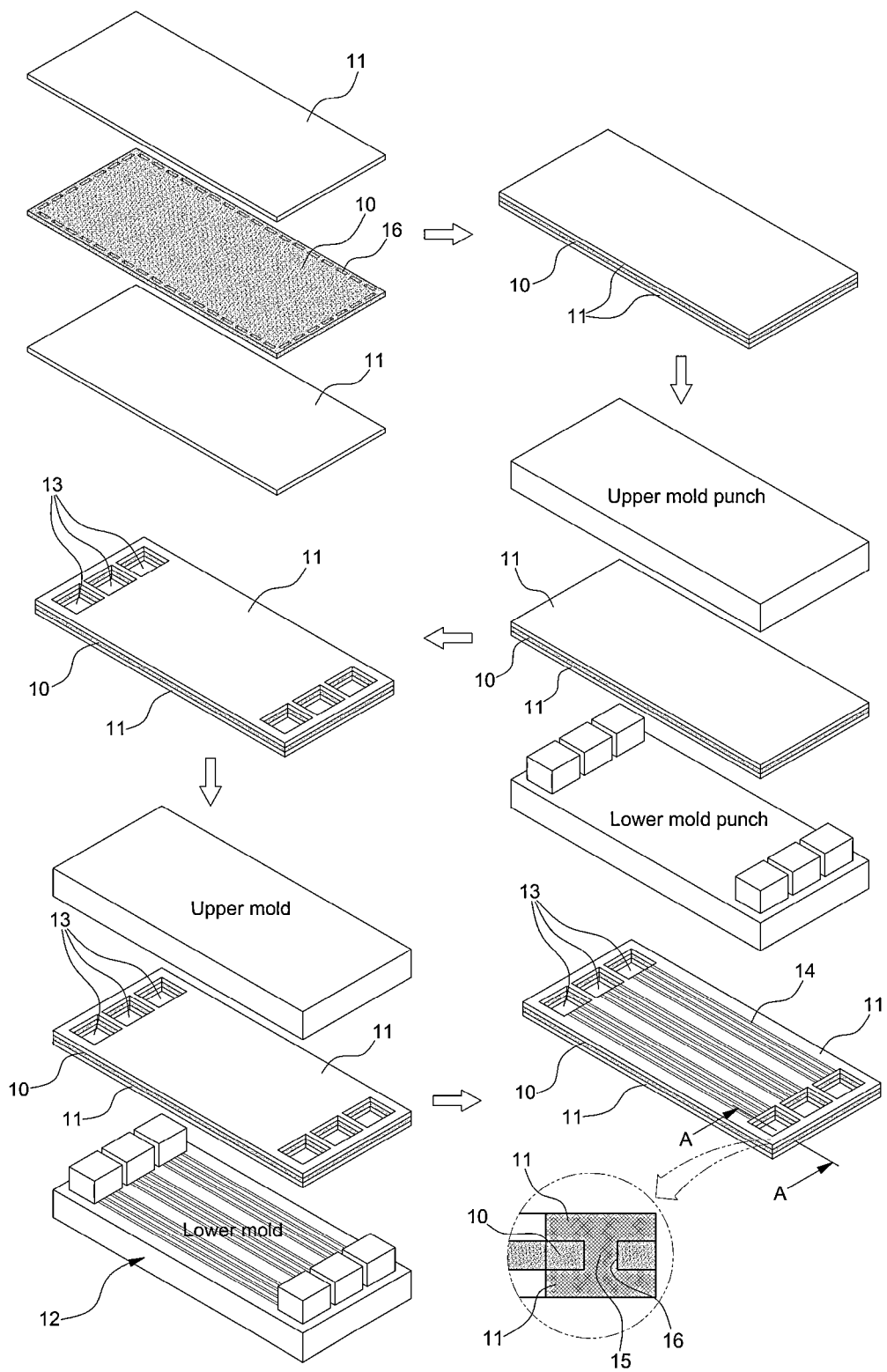
FIG. 2 is a schematic diagram showing a method for manufacturing a fuel cell separator in accordance with a preferred embodiment of the present invention.

FIG. 2 shows an embodiment of the invention. As shown therein, a carbon fiber reinforced composite material 10 in the form of prepreg is provided. The composite material includes a plurality of holes 16 formed at regular intervals along the edges is provided Also provided are graphite foils 11 having the same size as the composite material and are stacked on both sides of the carbon fiber reinforced composite material 10.

When the graphite foils 11 are stacked on both sides of the carbon fiber reinforced composite material 10, manifolds 13 as air/hydrogen/and coolant supply paths can be formed on both ends thereof using a punching mold. Then, channels 14 for air/hydrogen/coolant flow can be formed on the outer surface of each graphite foil 11 using a hot press 12 for channel formation.

Here, the graphite foils 11 are bonded to the carbon fiber reinforced composite material 10 by a high temperature compressive force applied by the hot press 12. At the same time, a portion of the graphite foils 11 is locally deformed and/or expanded to fill in the holes 16 from both sides of the carbon fiber reinforced composite material 10 such that the graphite foils 11 stacked on both sides of the carbon fiber reinforced composite material 10 are brought into direct contact with each other.

That is, when the carbon fiber reinforced composite material 10 and the graphite foils 11 are pressed by the hot press 12 at high temperature and high pressure, a portion of the graphite foils 11 becomes filled in the holes 16 of either side of the carbon fiber reinforced composite material 10 by the deformation of the graphite foils 11 in the thickness direction over each hole, thereby forming a connecting portion 15 in each hole 16 of the carbon fiber reinforced composite material 10. Therefore, the graphite foils 11 bonded to the both surfaces the carbon fiber reinforced composite material 10 are conductively connected to each other by the connecting portions 15.

Figure 4:
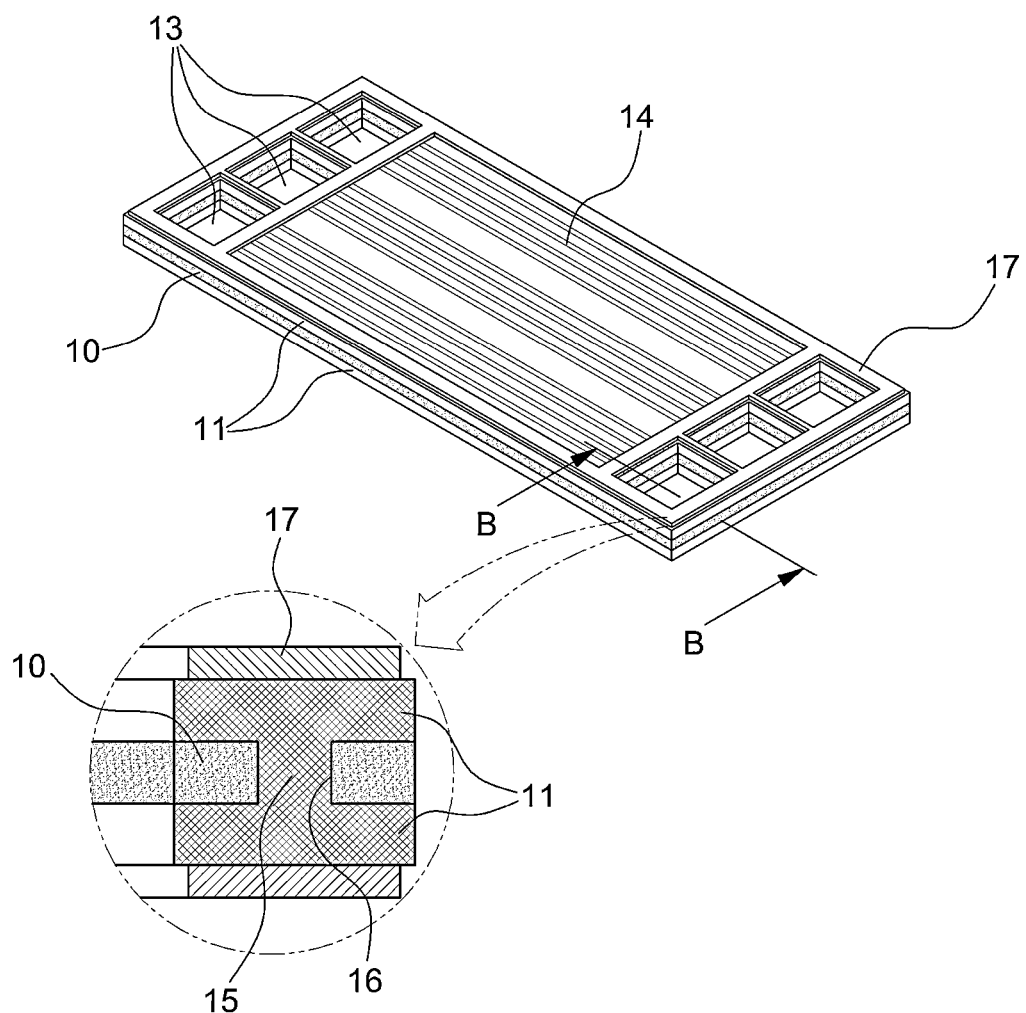
FIG. 4 is a schematic diagram showing a fuel cell separator in accordance with a preferred embodiment of the present invention to which a gasket is boned.

Meanwhile, as shown in FIG. 4, a gasket 17 for maintaining air tightness can be boned to the edges of the each graphite foil 11. Accordingly, it is preferred that the plurality of holes 16, in which the connecting portions 15 of the graphite foils 11 is filled, be formed along the edges of the carbon fiber reinforced composite material 10 to which the gasket 17 is bonded 17. The reason for this is that the surface pressure for fastening a fuel cell stack is significantly increased on the gasket 17 during fastening of the fuel cell stack. And, if the connecting portions 15 of the graphite foils 11 are located on the gasket 17, the contact resistance between the graphite foils 11 is reduced, thereby increasing the electrical conductivity.

The method for manufacturing the composite separator for the polymer electrolyte membrane fuel cell of the present invention having the above-described configuration will be described in more detail with reference to FIG. 2, as follows.

First, a carbon fiber reinforced composite material 10 in the form of prepreg, in which continuous carbon fibers having a diameter of about 7 μm are bound together by a thermosetting polymer binder is provided. In addition, graphite foils 11 are provided.

Here, the carbon fiber reinforced composite material 10 in the form of prepreg includes a plurality of holes 16 formed along the edges to which a gasket is to be later bonded.

The graphite foils 11 are stacked on both sides of the carbon fiber reinforced composite material 10, and a punching process for forming air/hydrogen/coolant supply manifolds 13 on both ends thereof is performed. This forms a separator in the form of laminate in which the air/hydrogen/coolant supply manifolds 13 are formed.

Next, the separator in the form of laminate is disposed on a hot press 12 for channel formation, in which a pattern for channel formation is formed on upper and lower molds, and a high temperature of about 150 to 200° C. and a high pressure of about 1 to 30 MPa are applied thereto such that channels 14 as air/hydrogen/and coolant supply paths are formed on the outer surface of the graphite foils 11. Then, the resulting carbon fiber reinforced composite material 10, to which the resulting graphite foils 11 are bonded, is allowed to be cured.

Figure 3:
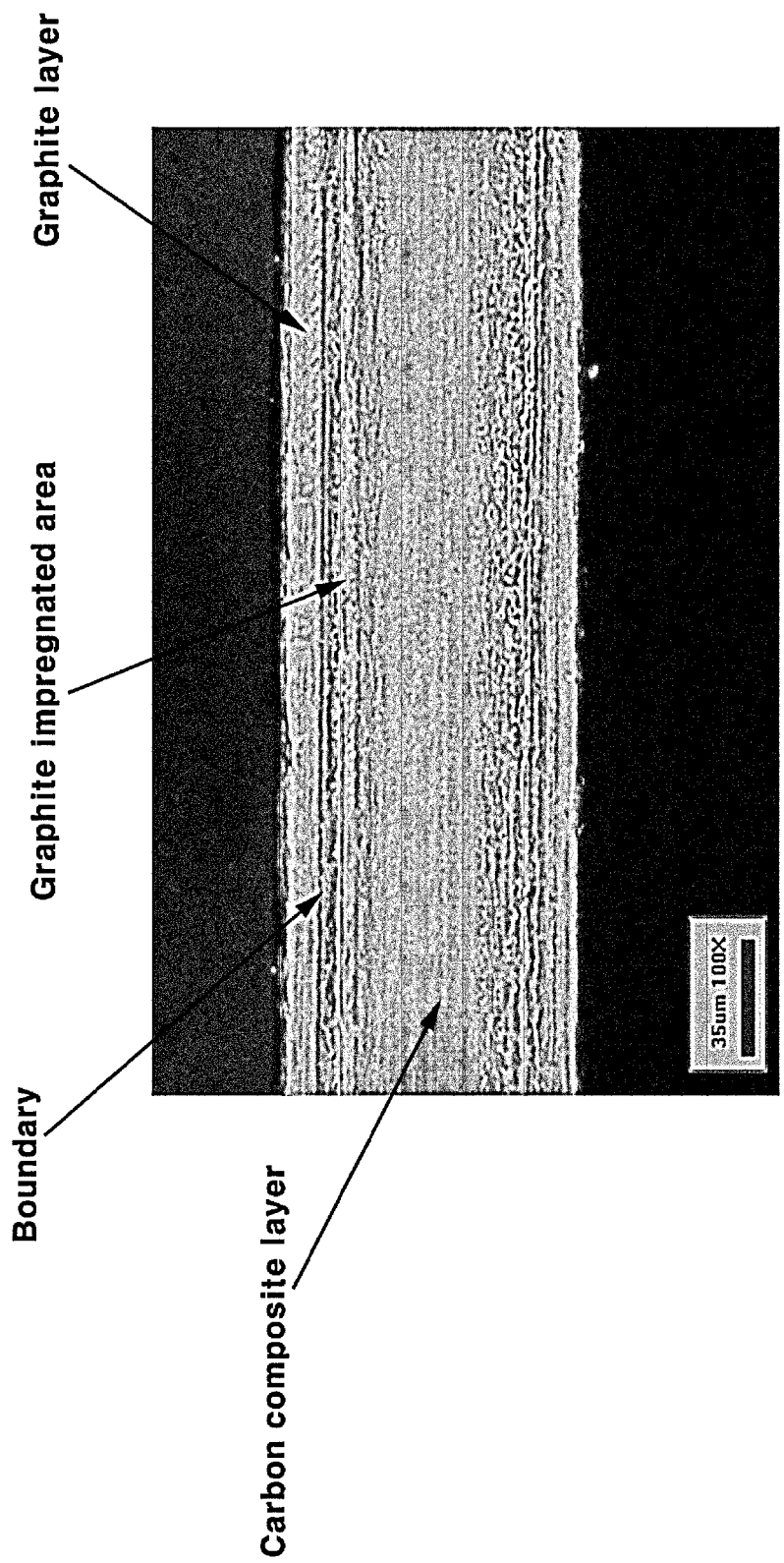
FIG. 3 is an electron micrograph image showing the cross section of a bonding portion between a continuous carbon fiber reinforced composite material and graphite foils that constitute the fuel cell separator in accordance with a preferred embodiment of the present invention.

Here, as the high temperature and high pressure are applied to the separator by the hot press 12 for channel formation, the carbon fiber reinforced composite material 10 and the graphite foils 11 are bonded to each other at the boundary therebetween as shown in FIG. 3.

In more detail, as shown in FIG. 3, a small amount of excessive resin of the carbon fiber reinforced composite material 10 is impregnated into the graphite foils 11 stacked on the outermost surfaces of the carbon fiber reinforced composite material 10 to be mechanically bonded to each other and, at the same time, a graphite layer is formed on the outermost surface of the separator.

Connecting portions 15 are formed in the holes 16 of the composite material 10 as the graphite foils 11 are locally deformed and filled into the plurality of holes 16. Therefore, the graphite foils 11 bonded to the both surfaces of the carbon fiber reinforced composite material 10 are brought into direct contact with each other by the connecting portions 15 formed in each of the holes 16.

Typically, since the graphite foil is deformed up to 43% in the thickness direction during high pressure compression, the connecting portions 15 are formed in the holes 16 of the carbon fiber reinforced composite material 10. As a result, as shown in the enlarged view of FIG. 1, the graphite foils 11 are brought into direct contact with each other by the connecting portions 15, thereby forming an electrical conductive path.

Therefore, the interfacial resistance and electrical contact resistance between the carbon fiber reinforced composite material 10 and the graphite foils 11 can be reduced and the hydrophilicity of the surface of the separator is increased due to the graphite foils having high surface energy disposed thereon to facilitate the circulation of water produce by the reaction, thereby reducing the energy loss.

As described above, the present invention provides the following effect.

According to the present invention, the graphite foils are bonded to both sides of the carbon fiber reinforced composite material in such a manner that a part of the graphite foils is filled in the plurality of holes formed in the carbon fiber reinforced composite material and the graphite foils are brought into direct contact with each other, thereby reducing the electrical resistance and increasing the hydrophilicity of the surface of the separator, thereby facilitating the removal of water produced by the reaction in the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a composite separator for a polymer electrolyte membrane fuel cell, the method comprising:
   providing a carbon fiber reinforced composite material in the form of prepreg including a plurality of holes and graphite foils having the same size as the carbon fiber reinforced composite material;
   stacking the graphite foils on both sides of the carbon fiber reinforced composite material and forming air/hydrogen/coolant supply manifolds on both ends thereof;
   forming channels on an outer surface of each graphite foil by applying a high temperature and high pressure mold for channel formation; and
   allowing a connecting portion to be formed in each hole of the carbon fiber reinforced composite material as a portion of the graphite foils is filled into the holes by the high temperature and high pressure applied during the formation of the channels, wherein the graphite foils stacked on both sides of the carbon fiber reinforced composite material are conductively connected to each other.

2. The method of claim 1, wherein the carbon fiber reinforced composite material and the graphite foils are mechanically bonded to each other as a small amount of excessive resin of the carbon fiber reinforced composite material is impregnated into the graphite foils.

* * * * *